United States Patent [19]

Lu et al.

[11] Patent Number: 5,820,667
[45] Date of Patent: Oct. 13, 1998

[54] FLUSHED PIGMENTS AND METHOD FOR MAKING FLUSHED PIGMENTS

[75] Inventors: Zheng Lu, Panama City; Thomas C. Jordan, Century, both of Fla.

[73] Assignee: Arizona Chemical Company, Panama City, Fla.

[21] Appl. No.: 826,011

[22] Filed: Mar. 27, 1997

[51] Int. Cl.$^6$ .................................................. C09C 67/00
[52] U.S. Cl. ...................... 106/413; 106/31.73; 106/400; 106/401; 106/412
[58] Field of Search .................................. 106/400, 401, 106/413, 31.73, 412

[56] References Cited

U.S. PATENT DOCUMENTS

| | | | |
|---|---|---|---|
| 3,615,812 | 10/1971 | Clark | 106/31.73 |
| 4,116,924 | 9/1978 | Peabody | 106/412 |
| 4,155,773 | 5/1979 | Ferrill, Jr. | 106/31.73 |
| 4,189,410 | 2/1980 | Larurito | 524/272 |
| 4,574,057 | 3/1986 | Kaza et al. | 106/31.73 |
| 4,664,710 | 5/1987 | Gleason et al. | 106/31.6 |
| 4,693,846 | 9/1987 | Piccirilli et al. | 106/31.75 |
| 4,971,626 | 11/1990 | Kveglis et al. | 106/31.73 |
| 5,410,004 | 4/1995 | Williams | 526/237 |
| 5,549,741 | 8/1996 | Pennaz et al. | 106/31.67 |
| 5,569,701 | 10/1996 | Moynihan | 106/31.75 |

OTHER PUBLICATIONS

Chemical Abstracts #CA126(3):33230Y entitled "Manufacture of rosin–modified, self–gelling phenolic resin binders for offset printing inks". Oct. 1996.

*Primary Examiner*—Mark L. Bell
*Assistant Examiner*—Scott L. Hertzog
*Attorney, Agent, or Firm*—Luedeka, Neely & Graham, P.C.

[57] ABSTRACT

The specification discloses a method for treating a pigment presscake containing pigment and water to remove the water therefrom. The method is carried out by contacting the presscake with a flushing agent containing an uncatalyzed or acid catalyzed rosin ester and an ink oil to provide a mixture containing the pigment, the flushing agent and water which is then separated from the mixture by well known separation techniques such as decanting to provide a flushed pigment. The specification also discloses a flushing agent and an ink composition containing the uncatalyzed or acid catalyzed rosin ester.

36 Claims, No Drawings

FLUSHED PIGMENTS AND METHOD FOR MAKING FLUSHED PIGMENTS

FIELD OF THE INVENTION

The invention relates to flushed pigments, methods for flushing pigments and ink formulations containing flushed pigments.

BACKGROUND

Pigments are insoluble, fine particle size materials used in a number of applications including ink formulations, coatings, paints and the like to provide color, to hide substrates, to modify the properties of coatings, to modify the performance properties of films. In general, most letterpress and lithographic inks are manufactured using dispersed pigment concentrates in a nonaqueous medium.

Pigments are generally produced in an aqueous medium. One of the steps in manufacture of pigments is precipitation from water. After precipitating the pigment, the pigment/water mixture is filtered to provide a filter cake or presscake containing pigment and some residual moisture.

When the pigment is to be incorporated in an organic or non-aqueous system for application to a substrate, it is necessary to remove the residual moisture from the filter cake or presscake. The presscake typically contains 30 to 80% by weight water. Removal of residual water from a presscake is generally accomplished by a process of water displacement known in the art as "flushing."

Generally speaking, flushing is the direct transfer of pigments in an aqueous phase to an oil or nonaqueous phase without intermediate drying. Flushing of the pigment is carried out by intensely mixing the presscake with an ink oil or a flushing varnish. A "flushing varnish" is an ink oil containing a resin dissolved therein. The oil and/or flushing varnish is often referred to as a "flushing agent." "Ink oil", as used herein, refers to any petroleum or vegetable derived oil which may be used as a printing ink solvent.

As the pigment is wet by the oil in the flushing agent, the water is driven out of the presscake until only a small percentage of water remains. The last traces of water are removed by applying a subatmospheric pressure and/or heat to the presscake. The flushing agent in effect "flushes" the water from the pigment resulting in a pigment dispersion in the flushing agent. Alkyd resins are sometimes used in addition to the flushing agent to assist in the breakout of water from the presscake.

Pigments at the presscake stage of manufacture have a particle size which is more suitable for maximum ink gloss and color strength in lithographic ink formulations than pigments in their finished dry form. Accordingly, flushed pigments produced without first drying the pigment are preferred colorants for lithographic ink formulations.

Conventional flushing varnishes contain compounds selected from base catalyzed rosin esters, hydrocarbon-based resins and terpene resins. The base catalyzed rosin esters are typically maleic or phenolic modified rosin esters.

Base catalyzed rosin esters are generally more expensive than the hydrocarbon-based resins and are typically regarded as having relatively inferior water removal efficiency because of the complexity of treating presscakes with such compounds. Hydrocarbon-based resins and modified hydrocarbon resins such as phenol modified dicyclopentadiene (DCPD) resins, while generally more effective as flushing agents than base catalyzed rosin esters, have been viewed as environmentally undesirable in recent years.

Accordingly, it is an object of the invention to provide an improved flushing agent for pigments.

Another object of the invention is to provide an improved method for flushing residual water from pigments.

Yet another object of the invention is to provide an environmentally friendly pigment flushing agent which more clearly displaces water from a pigment presscake with minimum emulsification of the material with the water.

Still another object of the invention is to provide a method for displacing water from a pigment presscake which can be carried out economically.

An additional object of the invention is to provide an ink composition containing pigment and an improved flushing agent.

The Invention

With regard to the above and other objects, the invention provides a method for treating a presscake containing pigment and residual water which comprises mixing the presscake with a flushing agent containing a rosin ester made in the absence of a basic catalyst, ink oil and, optionally, a water breakout aid, to provide a mixture which contains water, the pigment and the flushing agent. Water is then separated from the mixture.

In another aspect, the invention provides a pigment composition for use in making ink which comprises an ink pigment, an acid catalyzed rosin ester, an ink oil and, optionally, a water breakout aid, wherein the composition is substantially free of water.

According to yet another aspect of the invention, a method is provided for making an ink composition which comprises combining a pigment composition containing pigment and a flushing agent containing a rosin ester made in the absence of a basic catalyst and an ink oil with a material selected from the group consisting of a water breakout aid, an ink varnish and a wax compound or wax dispersion.

Another aspect of the invention provides a method for treating a presscake containing pigment and residual water which comprises mixing the presscake with a flushing agent containing an acid catalyzed or uncatalyzed rosin ester, ink oil and, optionally, a water breakout aid, to provide a mixture which contains water, the pigment and the flushing agent. Water is then separated from the mixture.

The invention provides an economical and efficient pigment flushing agent and a method which is highly effective for flushing pigments and which enables production of inks having excellent gloss and color transfer properties. The method produces a more thorough separation of water (water breakout) than conventional base catalyzed rosin esters. Accordingly, processing time is reduced with potentially fewer and less expensive auxiliary or clean-up steps and with reduced environmental concerns.

A key feature of the invention is the use of an ester formed by the base catalyst-free esterification of rosin and a polyhydric alcohol or polyol such as pentaerythritol, glycerin, dipentaerythritol, tripentaerythritol, trimethylol ethane, trimethylol propane, ethylene glycol, polyethylene glycol, 1,3-propanediol, 1,4-butanediol, 1,5-pentanediol, 1,6-hexanediol, trimethylene glycol, propylene glycol, neopentyl glycol and the like. The term "rosin" as used herein will be understood to include gum rosin, wood rosin, tall oil rosin and modified rosins, i.e. dimerized, maleated and/or polymerized versions of any of these rosins. Rosin is derived from pine trees (chiefly *pinus palustris* and *pinus elliottii*). Gum rosin is the residue obtained after the distillation of turpentine from the oleoresin tapped from living pine trees. Wood rosin is obtained by extracting pine stumps with naphtha or other suitable solvents and distilling off the volatile fraction. Tall oil rosin is a co-product of the fractionation of tall oil which in turn is a by-product of the wood pulping process. The principle constituents of rosin are rosin acids of the abietic and pimaric types. The acids usually have the general formula $C_{19}H_{29}COOH$ with a phenanthrene nucleus. Preferred rosins for use in the present invention are tall oil rosin and gum rosin.

The reaction between the rosin and alcohol is preferably conducted with a stoichiometric excess of alcohol relative to acids present in the rosin wherein the ratio of moles of alcohol to moles of acids in the rosin ranges from about 1.05:1 to about 1.5:1. More or less alcohol may be used, however, for best results, i.e., lowest product acid numbers and lowest volatility, the ratio of moles of alcohol per mole of acids in the mixture is most preferably within the range of from about 1.3:1 to about 1.4:1. It is preferred that the resulting rosin ester have an acid number below about 25, more preferably below about 20 and most preferably below about 17.

The esterification of the rosin may be conducted in the presence or absence of an acid catalyst. As used herein, "acid catalyzed rosin ester" means a rosin ester made using an acid catalyst and "uncatalyzed rosin ester" means a rosin ester made in the substantial absence of any acid or base catalyst.

Suitable acid catalysts may be selected from Bronsted acids which include mineral acids and organic acids such as hypophosphorous acid, phosphorous acid, sulfuric acid, trisnonylphenylphosphite, toluene sulfonic acid, and the like. The amount of catalyst used for reacting a rosin with a polyhydric alcohol is based on the weight of rosin in the mixture and ranges from about 0% to about 5% by weight, preferably from about 0% to about 0.2% by weight.

A suitable reaction vessel for the esterification will typically contain a condenser for condensation and removal of water formed during the reaction and a means for mixing or stirring the reactants to assure complete reaction.

The reaction is typically conducted at a temperature in the range of from about 200° to about 290° C. Higher or lower temperatures may be used, however, for the most efficient reaction, temperatures in the above range are preferred. Total reaction time may range anywhere from about 10 to about 35 hours depending on the amount of reactants and scale of reaction equipment used. Accordingly, means are required for sustained or continuous heating of the reactants in the vessel. Suitable heating means include internal and external heaters as well as heated external circulation loops. However, the means for heating the reactants is not believed to be critical to the invention.

The reaction is conducted at atmospheric pressure and/or subatmospheric pressures, however, superatmospheric pressures may also be used. In order to reduce undesirable side reaction or oxidations, it is preferred to conduct the reaction under an inert gas blanket or purge employing, for example, nitrogen gas.

Completion of the reaction may be determined by the amount of water being formed as the reaction proceeds. Near the completion of the reaction, the amount of water being formed is substantially reduced. Completion of the reaction may also be determined by the acid number of the reaction mass. A low acid number relative to the acid number of the rosin charged to the reaction mass indicates that the reaction is near completion. Acid numbers in the range of 2 to 20 are typical for the desired reaction product.

Prior to reacting the rosin with the polyol, the rosin may be modified in order to alter various properties of the finished resin. Modification of the rosin may be provided by reacting rosin with a formaldehyde-phenol compound. Suitable phenol compounds which may be used to modify rosin include, without limitation, mononuclear or polynuclear phenols, mono- or poly-substituted $C_1$ to $C_{12}$-alkyl-phenols in which the $C_1$ to $C_{12}$ groups may be straight or branched chain alkyl groups. The reaction may be conducted by heating rosin with formaldehyde and at least one of the beforementioned phenol compounds at a temperature ranging from about 130° to about 200° C., and preferably from about 140° to about 180° C.

Modification of rosin may also be provided by reacting rosin with a carboxylic acid compound or anhydride thereof which contains carbon double or triple bonds and are known to be dieneophiles. Examples of suitable acid or anhydride compounds which may be used include, without limitation, maleic anhydride, maleic acid, fumaric acid, acrylic acid, methacrylic acid, propiolic acid, itaconic acid, cinnamic acid and/or combinations of two or more of the foregoing. Modification of rosin by these acid or anhydride compounds is usually conducted by Diels-Alder-type reactions.

Once the reaction is complete, the rosin ester is steam and/or nitrogen gas stripped in order to remove low molecular weight materials from the reaction mass and to provide a resin having a relatively high softening point and relatively high solubility (aliphatic ink oil dilutability). Such resins are particularly suitable for lithographic ink formulations. A relatively high softening point for an acid catalyzed rosin ester is preferably in the range of from about 100° to about 150° C., most preferably from about 105° to about 120° C. Such softening points are determined according to ASTM Designation E28-67 method.

The solubility of the rosin ester is determined by titrating 10 grams of a 50% solution of the resin in MAGIESOL 47 with MAGIESOL 47, with stirring until the mixture reaches a cloud point or until 200 milliliters has been titrated into the solution at 25° C. The titrated amount is referred to as "MAGIESOL 47 (M47) tolerance." It is preferred, but not required, that the M47 tolerance of the rosin ester be above about 200 milliliters. Lower M47 tolerances are acceptable in some applications. MAGIESOL 47 has a Kauri butanol (KB) value of about 24.5, an aniline point of about 82.8° C. and a distillation range of about 240° to about 277° C. and is commercially available from Magie Brothers Oil Company, Division of Pennzoil of Franklin Park, Ill.

In addition to the rosin ester, the flushing agent for a lithographaphic ink pigment contains a relatively high boiling ink oil such as EXXPRINT 283D, which is a hydrogenated aliphatic ink oil commercially available from Exxon Company U.S.A. of Houston, Tex. or MAGIESOL 47. By "relatively high" it is meant that the boiling point of the material should be at least about 180° C. (and preferably at least about 240° C.), however, ink oils of widely varying boiling points, depending on the particular printing application, may be used in combination with the rosin ester as a flushing agent. Other suitable ink oils include, without limitation, petroleum distillates, hydrotreated petroleum distillates, vegetable oils and esters of fatty acids.

For use in flushing heatset or sheetfed lithographic ink pigments, the boiling point range of the ink oil preferably ranges from about 190° to about 535° C. and most preferably ranges from about 240° to about 307° C. The amount of oil in the flushing agent may range from about 20 to about 95% by weight, preferably from about 35 to about 45% by weight based on the total weight of the flushing agent.

A water breakout aid may also be included with the flushing agent as an optional ingredient to aid in the water breakout from the presscake. Typical water breakout aids include, without limitation, alkyd resins, linseed oil, soya oil, tung oil and blended mixtures of linseed oil, soya oil and/or tung oil. The amount of water breakout aid may range from about 0 to about 25% by weight of the total weight of the mixture of flushing agent and water breakout aid. A preferred breakout aid is an alkyd resin and a preferred amount of breakout aid ranges from about 14% to about 18% by weight.

Pigments which may be flushed by the process according to the invention are typically organic pigments which are precipitated from aqueous reaction mediums. Exemplary pigments are, without limitation, copper phthalocyanine blues and greens, lithol rubine and Naphthol reds, diarylide yellow and the like. The invention is generally applicable to any pigment containing residual water which needs to be flushed in order to render the pigment suitable for use in an ink composition.

In the conventional pigment manufacturing process, the precipitated pigments are filtered to remove the bulk of the aqueous reaction medium and to form a filter cake of solid pigment particles. However, even after filtering and pressing, the resulting presscake may still contain up to about 80% by weight residual water.

In order to remove a sufficient amount of water from the presscake to make it useful in an organic ink system, the presscake is contacted with the flushing agent containing a rosin ester esterified in the absence of a base catalyst and, optionally containing an alkyd resin under conditions sufficient to substantially separate or displace the water from the pigment in presscake. The contacting may be done in any suitable vessel, under atmospheric, subatmospheric or superatmospheric pressures and at room temperatures. Preferably, the presscake and flushing agent are contacted by mixing them together in a vessel containing a high shear mixer such as a Baker Perkins-type flusher.

The amount of flushing agent used relative to the amount of presscake will depend on the amount of pigment in the presscake. Under typical conditions, the presscake will contain about 30 to about 40% by weight pigment. Accordingly, the weight ratio of the amount of flushing agent relative to the amount of pigment in the presscake may range from about 1.0:1 to about 1.5:1. Preferably, the ratio of flushing agent to the amount of pigment in the presscake is from about 1.2:1 to 1.3:1, and most preferably the ratio is about 1.29:1.

The presscake and flushing agent are mixed in the high shear mixing vessel for a time sufficient to achieve intimate contact between the flushing agent and the pigment to enable displacement of the water therefrom. The time needed varies according to a number of factors and will be established on a case-by-case basis, however, it is generally believed that mixing for about 10 minutes or more or until the displaced water becomes substantially clear will be sufficient for most flushing processes.

During the mixing, an organic phase containing coated pigment particles and flushing agent will separate from an aqueous phase which contains water displaced from the pigment in the presscake. The coated pigment particles are substantially lipophilic in the organic phase and readily separate with the flushing agent as a distinct phase relative to the aqueous phase containing the displaced water.

While not desiring to be bound by theory, it is believed that as a result of the contacting by mixing or otherwise, the pigment particles in the presscake become coated with the flushing agent thereby displacing water from the surface of the pigment particles as a result of a greater affinity of the pigment for ingredients of the flushing agent. This is contrasted with flushing agents which contain base catalyzed rosin esters. The tendency of these agents to produce emulsions has been tolerated due to the particular need for rosin based resins in certain ink applications. It has now been found, contrary to expectations, that an acid catalyzed or uncatalyzed rosin ester more effectively displaces water from a presscake resulting in substantially more water separation from the presscake and organic phase.

Typically, the phases will separate during mixing into distinct layers or phases. The aqueous phase may be separated from the organic phase by conventional techniques such as decantation, distillation, centrifugation, evaporation and the like. It is preferred, however, to initially decant the water from the mixture which removes the bulk of the water from the flushed pigment. If desired, additional presscake may be added to the mixture in order to increase the pigment loading in the flushed pigment.

After the initial contacting and separation steps, the organic phase may still contain a small amount of water which is typically removed by applying a subatmospheric pressure and/or heat while stirring the flushed pigment. Open mixing to promote natural evaporation of water may also be used, however, the time required to remove the residual water may be longer than the time required when heat and/or subatmospheric pressures are applied to the organic phase. Furthermore, care must be taken with certain pigments to prevent overheating the pigments which can cause degradation or decomposition thereof. However, the amount of heat and vacuum used to remove the remaining water is not critical to the invention and is well within the skill of those in the art.

The following nonlimiting examples illustrate various aspects of the invention.

EXAMPLE 1

Flushing agents were prepared from 20 grams of EXXPRINT 283-D and 30 grams of acid catalyzed rosin ester (Samples 1, 4, 6 and 8), 30 grams of base catalyzed rosin ester (Samples 2 and 5), 30 grams of uncatalyzed gum rosin ester (Sample 7) or 30 grams of a modified hydrocarbon (Sample 3 - LX -2000) which is commercially available from Neville Chemical Company of Pittsburgh, Pa. The composition and properties of the flushing agents are shown in the following table.

TABLE 1

| Flushing Agent Composition and Properties | | | | | | | | |
|---|---|---|---|---|---|---|---|---|
| | Sample 1 | Sample 2 | Sample 3 | Sample 4 | Sample 5 | Sample 6 | Sample 7 | Sample 8 |
| Resin | 105 NS[3] | BC-4510[4] | LX-2000[5] | 580-146[6] | 567-168[7] | 580-143[8] | 567-179[9] | 580-162[10] |
| Resin(grams) | 30 | 30 | 30 | 30 | 30 | 30 | 30 | 30 |
| EXXPRINT 283-D(grams) | 20 | 20 | 20 | 20 | 20 | 20 | 20 | 20 |

TABLE 1-continued

Flushing Agent Composition and Properties

|  | Sample 1 | Sample 2 | Sample 3 | Sample 4 | Sample 5 | Sample 6 | Sample 7 | Sample 8 |
|---|---|---|---|---|---|---|---|---|
| Viscosity[1] @ 25° C. (secs.) | 11 | 186 | 121 | 162 | 1451 | 272 | 20 | 45 |
| Color[2] | 6+ | 13 | 14+ | 11 | 14 | 11 | 8 | 10+ |
| M47 Tolerance (mL) | >200 | >200 | >200 | >200 | >200 | 140 | >200 | >200 |

[1]Viscosity - is in bubble seconds determined using a bubble tube in a line to line reading traveling from the bottom to the top of the tube in a water bath maintained at 25° C. in accordance with the ASTM D-1545-89 method.
[2]Color is Gardner color determined using a Gardner Delta comparator available from Pacific Scientific, Gardner Laboratory Div. of Bethesda, Maryland.
[3]105-NS is SYLVATAC 105 NS which is an acid catalyzed rosin ester having a softening point of from about 103° to about 107° C. (ring and ball, by ASTM E28-92 method), an acid number of from about 5 to about 13 (by ASTM D 803-93 method) which is commercially available from Arizona Chemical Company of Panama City, Florida.
[4]BC-4510 is BECKACITE 4510 which is a base catalyzed maleic modified rosin ester having a softening point of from about 125° to about 135° C. (ring and ball, by ASTM E28-67 method), an acid number of about 25 maximum (by ASTM D 465-59 method) which is commercially available from Arizona Chemical Company of Panama City, Florida.
[5]LX-2000 is a modified hydrocarbon resin which is commercially available from Neville Chemical Company of Pittsburgh, Pennsylvania
[6]580-146 is a hypophosphorous acid catalyzed phenolic modified rosin ester of rosin and pentaerythritol having a softening point of about 122° C. (ring and ball, by ASTM E28-67 method), an acid number of about 13.7 (by ASTM D 465-59 method) and is an experimental product of Arizona Chemical Company of Panama City, Florida.
[7]567-168 is a magnesium oxide (base) catalyzed phenolic modified rosin ester of rosin and pentaerythritol having a softening point of about 142° C. (ring and ball, by ASTM E28-67 method), an acid number of about 6.9 (by ASTM D465-59) and is an experimental product of Arizona Chemical Company of Panama City, Florida.
[8]580-143 is a hypophosphorous acid catalyzed maleic modified rosin ester of rosin and pentaerythritol having a softening point of about 128° C. (ring and ball, by ASTM E28-67 method), an acid number of about 17.7 (by ASTM D465-59) and is an experimental product of Arizona Chemical Company of Panama City, Florida.
[9]567-179 is a pentaerythritol ester of gum rosin made without catalyst having a softening point of about 114° C. (ring and ball, by ASTM E28-67 method), an acid number of about 15.6 (by ASTM D465-59) and is an experimental product of Arizona Chemical Company of Panama City, Florida.
[10]580-162 is a trisnonylphenylphosphite catalyzed pentaerythritol ester of dimerized rosin (SYLVATAC 295 which is commercially available from Arizona Chemical Company of Panama City, Florida) having a softening point of about 128.3° C. (ring and ball, by ASTM E28-67 method), an acid number of about 13.0 (by ASTM D465-59) and is an experimental product of Arizona Chemical Company of Panama City, Florida.

After determining the viscosity, color and solubility of the flushing agents shown in Table 1, a pigment flush composition was made from each sample by weighing 30.05 grams of the flushing agent into the mixing container of a DUKE model D-10 emulsification tester, available from Duke Custom Systems, Inc. of Pleasant View, Tennessee and adding 5 grams of a number 3 body tall oil based alkyd resin and 64.95 grams of phthalocyanine blue presscake. The mixture was mixed in the emulsification tester at 90 rpm for 5 minutes. After running for 5 minutes, the sides of the mixing container were scraped with an ink spatula and the emulsification tester was run an additional 5 minutes at 90 rpm after which the displaced water was decanted from the mixing container and weighed. The composition of the flushed pigment and the results of the flushing tests are shown in the following table.

In the tables, samples 2 and 6 were maleic modified rosin esters which had similar formulas with the exception that sample 2 was prepared using a base catalyst and sample 6 was prepared using an acid catalyst. Likewise, samples 4 and 5 were phenol modified rosin esters of the same formula with the exception that sample 4 was prepared using an acid catalyst and sample 5 was prepared using a base catalyst.

As shown in Table 2, the acid catalyzed rosin esters (Samples 4 and 6) displaced substantially more water from the presscake than rosin esters of the same formula made using a base catalyst (Samples 2 and 5), and the acid catalyzed rosin ester and uncatalyzed rosin ester (Samples 1 and 7) removed more water from the presscakes than the hydrocarbon-based flushing agent (Sample 3). The acid catalyzed dimerized rosin ester (Sample 8) likewise displaced more water from the presscakes than the base cata-

TABLE 2

Flushed Pigment Composition and test data

|  | Sample 1 | Sample 2 | Sample 3 | Sample 4 | Sample 5 | Sample 6 | Sample 7 | Sample 8 |
|---|---|---|---|---|---|---|---|---|
| Flushing agent from table 1 (grams) | 30.05 | 30.05 | 30.05 | 30.05 | 30.05 | 30.05 | 30.05 | 30.05 |
| S-84 Alkyd (grams) | 5.0 | 5.0 | 5.0 | 5.0 | 5.0 | 5.0 | 5.0 | 5.0 |
| Presscake (grams) | 64.95 | 64.95 | 64.95 | 64.95 | 64.95 | 64.95 | 64.95 | 64.95 |
| Water decanted from flushes after 10 minutes mixing | | | | | | | | |
| (grams) | 32.33 | 23.28 | 31.45 | 26.59 | 18.17 | 28.93 | 32.47 | 33.81 | lyzed rosin esters. In addition, the color transfer properties of the flushed pigment containing the acid catalyzed rosin esters were better than flushed pigments containing any of the other resins and the viscosities were generally lower so that less ink solvent was used in making the final ink formulation. Hence, it is clear from the foregoing samples that the amount of water removed when using an acid catalyzed or uncatalyzed rosin ester was substantially more than the amount of water removed when using a base catalyzed rosin ester as a component of the flushing agent.

The flushed pigments were further processed to remove the remaining water by running them in three passes over a laboratory model 4×8 three roll ink mill (without heat) and then two additional passes over the ink mill with the rolls being heated by injecting steam into the water cooling jackets of the rolls in order to provide a temperature of about 27° C. Prior to running the flushed pigments over the heated three roll mill, steam at about 100° C. was run through the cooling jacket of the mill for about 5 minutes to preheat the rolls.

Ink compositions were made by blending 32.0 grams of the flushed pigments of Samples 1, 2, 3, 7 and 8 with 48.0 grams of heatset type letdown ink varnish and 4.5 grams of a wax compound (CC-6437D commercially available from Carroll Scientific Co. Of Countryside, Ill.). The heatset letdown ink varnish contained 37% by weight BECKACITE 6009 resin, 9% by weight of BECKACITE 6006 resin, 1% by weight ACINTOL FA-2 fatty acid resin (which are all commercially available from Arizona Chemical Company of Panama City, Fla.), 5% by weight S-84 alkyd resin commercially available from Arizona Chemical AB of Sardarne, Sweden, 37.5% by weight M47 ink solvent, 2.5% by weight of oxyaluminum octoate (OAO) solution (50% by weight OAO in M47 solvent) and 8% by weight alkali refined linseed oil which is commercially available from Welch, Holme and Clark Company, Inc. of Newark, New Jersey. An amount of EXXPRINT 283D ink oil was added to each ink formulation in order to equalize the tack of the ink compositions to essentially the same tack.

After formulating the inks and adjusting the tack of each formulation to about 12.0, the printed ink properties were determined using a LITTLE JOE laboratory color proofer model S-80 which is commercially available from Little Joe Industries, of Belle Mead, N.J.

The water pick-up (P/U) rate comparison was determined for each of the ink formulations using a Duke emulsification tester (Duke model D10). Ink (50 grams each) was weighted into the mixing container of the tester along with 50 grams of distilled water. The mixing container was then placed on the emulsification tester and run for 2 minute intervals until all water was emulsified with the ink. The amount of time required for the ink to emulsify 100% of the water was recorded as the water P/U rate. The compositions, properties and water P/U rates for the inks are given in the following table.

TABLE 3

|  | Flushed Pigment from Sample #1 | Flushed Pigment from Sample #2 | Flushed Pigment from Sample #3 | Flushed Pigment from Sample #7 | Flushed Pigment from Sample #8 |
|---|---|---|---|---|---|
| Ink Compositions ||||||
| Letdown Varnish | 48.0 | 48.0 | 48.0 | 48.0 | 48.0 |
| Flushed Pigment (grams) | 32.0 | 32.0 | 32.0 | 32.0 | 32.0 |
| CC-6437D wax (grams) | 4.5 | 4.5 | 4.5 | 4.5 | 4.5 |
| EXXPRINT 283D (grams) | 2.80 | 6.25 | 5.75 | 3.85 | 4.4 |
| Ink Properties ||||||
| Tack[1] @ 1200 rpm | 12.1 | 12.0 | 12.0 | 12.1 | 12.0 |
| Gloss[2] | 20.8 | 18.2 | 19.8 | 22.1 | 23.4 |
| Density[3] | 2.18 | 1.92 | 2.21 | 2.18 | 2.26 |
| Misting[4] | 1+ | 0 | <1 | 1 | 1 |
| Ink Transfer to substrate | excellent | fair | good | excellent | excellent |
| Water P/U (min.) | 21 | 22 | 26 | 25 | 21 |

[1]Tack - Measured with Thwing Albert electronic inkometer at 1200 rpm and 32° C.
[2]Gloss was measured at 60° angle after subtracting the pre-measured gloss of the paper using a Gardner MICRO-TRI gloss reflectometer, commercially available from BYK-Gardner Inc. of Silver Springs, Maryland.
[3]Density - was measured with a digital reflection desitometer Model SOS-40 commercially available from Cosar Corporation of Garland, Texas.
[4]Misting - Measured by placing a coated paper sheet behind the rollers of the electronic inkometer while running at 1200 rpm for 1 minute. Ink mist deposited on the sheet was compared to test sheets rated numerically 0 through 10 with 0 being no misting and 10 being very heavy or severe misting.

As shown in the foregoing table, ink compositions containing the pigment and flushing agents of the invention (Samples 1, 7 and 8) had better transfer properties and higher gloss than ink compositions containing pigment and a flushing agent containing the base catalyzed rosin ester or a flushing agent containing a modified hydrocarbon resin. Furthermore, inks made using the flushing agent of the invention exhibited acceptable water P/U rates and relatively low misting.

The foregoing description of certain embodiments of the present invention has been provided for purposes of illustration only, and it is understood that numerous modifications and alterations may be made without departing from the spirit and scope of the invention as defined in the following claims.

What is claimed is:

1. A method for treating a presscake containing pigment and water which comprises contacting the presscake with a flushing agent containing ink oil, a rosin ester made in the absence of a basic catalyst and, optionally, a water breakout aid to provide a mixture which contains water, the pigment and the flushing agent, and separating water from the mixture.

2. The method of claim 1 wherein the flushing agent comprises an acid catalyzed ester of a dimer rosin.

3. The method of claim 1 wherein the flushing agent comprises a rosin ester selected from the group consisting of uncatalyzed and acid catalyzed gum, tall oil and wood rosin esters and uncatalyzed and acid catalyzed esters of dimerized rosin.

4. The method of claim 1 wherein water is separated from the mixture by decanting the water.

5. The method of claim 4 further comprising applying a subatmospheric pressure to the mixture to separate water therefrom.

6. A flushed pigment made by the method of claim 5.

7. The method of claim 1 wherein the presscake and flushing agent are contacted by mixing them together in a high-shear mixer and water is separated from the mixture during the mixing and then decanting the water.

8. The method of claim 1 further comprising contacting the mixture with additional presscake after separating water therefrom to form a second mixture containing water, the pigment and flushing agent and separating water from the second mixture.

9. The method of claim 8 further comprising applying a subatmospheric pressure to the second mixture to separate water therefrom.

10. The method of claim 1 wherein the ink oil comprises a relatively high boiling aliphatic ink oil.

11. The method of claim 1, wherein the ester comprises a maleic modified, acid catalyzed rosin ester.

12. The method of claim 1 wherein the water breakout aid comprises an alkyd resin.

13. A flushed pigment made by the method of claim 1.

14. A flushed pigment composition for use in making ink which comprises a pigment and a flushing agent wherein the flushing agent comprises a rosin ester made in the absence of a basic catalyst, an ink oil and, optionally, a water breakout aid, wherein the composition is substantially free of water.

15. The composition of claim 14 wherein the rosin ester is selected from the group consisting of uncatalyzed and acid catalyzed tall oil rosin esters, gum rosin esters, wood rosin esters and dimerized rosin esters of pentaerythritol.

16. The composition of claim 14 wherein the ink pigment comprises a pigment used in lithographic inks.

17. The composition of claim 14 containing from about 20 to about 60% by weight ink pigment and from about 30 to about 60% by weight flushing agent comprising from about 5 to about 80% by weight rosin ester and from about 10 to about 95% by weight ink oil.

18. The composition of claim 14 wherein the flushing agent comprises an acid catalyzed ester of a dimer rosin.

19. A method for treating a presscake containing pigment and water which comprises contacting the presscake with a flushing agent containing ink oil, an acid catalyzed or uncatalyzed rosin ester and, optionally, a water breakout aid to provide a mixture which contains water, the pigment and the flushing agent, and separating water from the mixture.

20. The method of claim 19 wherein the rosin ester comprises an acid catalyzed rosin ester.

21. The method of claim 20 wherein the rosin ester comprises an ester of dimer rosin and pentaerythritol.

22. The method of claim 19 wherein the flushing agent comprises an acid catalyzed ester of a dimer rosin.

23. A method for making an ink composition comprising combining a pigment composition containing pigment and a flushing agent containing a rosin ester made in the absence of a basic catalyst and an ink oil with a material selected from the group consisting of a water breakout aid, an ink varnish and a wax compound.

24. The method of claim 23 wherein the ink oil comprises a hydrocarbon-based ink oil.

25. The method of claim 23 wherein the rosin ester comprises a maleic modified rosin ester of pentaerythritol.

26. The method of claim 23 wherein the rosin ester comprises a acid catalyzed phenol modified rosin ester of pentaerythritol.

27. The method of claim 23 wherein the rosin ester comprises an uncatalyzed gum rosin ester.

28. The method of claim 23 wherein the rosin ester comprises an acid catalyzed ester of a dimer rosin.

29. The method of claim 23 wherein the pigment comprises a phthalocyanine-based pigment.

30. The method of claim 23 wherein the ink composition comprises a lithographic ink composition.

31. An ink composition made by the method of claim 23.

32. A flushed pigment composition for use in making ink which comprises a pigment and a flushing agent wherein the flushing agent comprises an acid catalyzed or uncatalyzed rosin ester, an ink solvent and, optionally, a water breakout aid, wherein the composition is substantially free of water.

33. The flushed pigment of claim 32 wherein the rosin ester comprises an acid catalyzed rosin ester.

34. The flushed pigment of claim 33 wherein the rosin ester comprises an ester of dimer rosin and pentaerythritol.

35. The flushed pigment of claim 32 wherein the rosin ester comprises an acid catalyzed ester of dimer rosin.

36. The flushed pigment of claim 32 wherein the water breakout aid comprises an alkyd resin.

* * * * *